UNITED STATES PATENT OFFICE 2,145,059

PRODUCTION OF BUTADIENE

Robert Stadler, Heidelberg, Karl Ackermann, Mannheim, and Erwin Lehrer, Ludwigshafen-on-the-Rhine, Germany, assignors to I. G. Farbenindustrie Aktiengesellschaft, Frankfort-on-the-Main, Germany No Drawing. Application April 26, 1938, Serial No. 204,460. In Germany May 3, 1937

6 Claims. (Cl. 260—680)

The present invention relates to a process of producing butadiene from vinylacetylene.

We have found that butadiene can be obtained in a simple and especially economical manner by treating vinylacetylene with amalgams of alkali metals in the presence of substances which develop hydrogen with the said amalgams. This is surprising because under the same conditions it is practically impossible to convert acetylene into ethylene.

As substances which develop hydrogen with amalgams there may be mentioned especially alcohols, water and also mixtures of water and alcohols. The use of alcohols has the advantage that the liquid has a higher solvent power for vinylacetylene. The process may be carried out at normal or elevated temperature and at any pressure. Thus for example the process may be carried out by bringing the amalgam together with water in a stirring vessel and leading in gaseous vinylacetylene. Gaseous vinylacetylene may also be led together with water vapor through or over anhydrous amalgam at elevated temperature. By varying the amount of water vapor, the amount of hydrogen evolved and consequently the speed of the reaction may be influenced in any desired manner. Furthermore, liquid amalgam and a liquid which contains vinylacetylene dissolved therein and develops hydrogen with amalgams, as for example an alcohol, may be caused to react on each other in countercurrent.

The activity of the amalgams of the individual alkali metals is different. Sodium amalgam acts most slowly, potassium amalgam acts appreciably more rapidly and rubidium amalgam has especially great hydrogenating action. Contrary to expectation, the action may be increased by using mixed alkali amalgams, as for example sodium-potassium amalgam. Such amalgams may also be more highly laden with alkali metal than the simple alkali amalgams without becoming solid.

The action of the amalgams may also be influenced by the addition of other metals. An addition of thallium has an especially accelerating action. By adding electrolytes, such as potassium phosphate, common salt, zinc salts or chromium salts to the reaction liquids or by adding certain gases to the vinylacetylene, the reaction may also be influenced. Thus the addition of 10 per cent of carbon dioxide to gaseous vinylacetylene increases the speed of hydrogenation to more than twice. During the reaction the alkali amalgam decomposes, for example under the action of water, into metallic mercury, hydrogen and alkali solution which remains practically pure and may therefore profitably be employed. The mercury separated may be alloyed with fresh alkali metal. The amalgam obtainable by the electrolysis of alkali may also be directly used.

The following examples will further illustrate how this invention may be carried out in practice but the invention is not restricted to these examples. The parts are by weight.

Example 1

9 liters of vinylacetylene which are led in a cycle are treated in a stirring vessel with 1500 grams of 2 per cent potassium amalgam and water at ordinary temperature. After an hour a sample of the gas has a content of 10.7 per cent of butadiene. After treatment for a further hour at 55° C., the gas has the following composition:—

| | Per cent |
|---|---|
| Vinylacetylene | 32.6 |
| Butadiene | 56.6 |
| Oxygen | 0.4 |
| Hydrogen | 8.7 |
| Methane and homologues | 0.0 |
| Nitrogen | 1.7 |

The gas is then liquefied and fractionally distilled. At from 4° to 3° below zero C., practically pure butadiene is obtained which may be polymerized to rubber in known manner.

Example 2

1300 grams of rubidium amalgam with about 1.5 per cent of rubidium are shaken with 400 cubic centimeters of water and 2.5 liters of gaseous vinylacetylene for 5 minutes at 20° C. vigorously in a shaking vessel. In this way 30.8 per cent of the vinylacetylene are converted into butadiene.

By using 1200 grams of potassium-thallium amalgam with about 1 per cent of potassium and 10 per cent of thallium, 59 per cent of the vinylacetylene are converted into butadiene under otherwise identical conditions.

Example 3

In an electrolyzing vessel with 5.5 kilograms of mercury containing 10 per cent of thallium, 20 per cent caustic potash solution is continuously electrolyzed. The amalgam thus formed is led in a cycle through a vessel in which it is brought into intimate contact with water and vinylacetylene, then pumped back again to the electrolyzing vessel. The caustic soda solution formed is replaced by fresh water continuously or periodically. By a single passage of 18 liters per hour of vinylacetylene, there are obtained about 42 per cent of 1.3-butadiene and about 8 per cent of 1.2-butadiene or methylallene besides less than 2 per cent of free hydrogen. No paraffin hydrocarbons can be detected in the gas.

In the same manner there can also be employed vinylacetylene containing about 4-5 per cent of acetaldehyde and some per cent of diacetylene, such as is obtained by treating electric arcacetylene containing about 90 per cent of acetylene and about 4 per cent of diacetylene with a solution of cuprous chloride and ammonium chloride in known manner. If about 40 per cent of the said vinylacetylene are converted into butadiene, the diacetylene present has been reduced. The acetaldehyde contained in the vinylacetylene does not cause any trouble. It is converted into ethyl alcohol by the amalgam employed.

*Example 4*

1 liter of gaseous vinylacetylene is vigorously shaken with a mixture of 300 grams of 2 per cent sodium amalgam or 500 grams of 2 per cent potassium amalgam and 300 cubic centimeters of an aqueous solution of 50 grams zinc chloride (anhydrous) and 1 gram of butyl naphthalene sulphonic acid sodium salt, which solution may further contain, if desired, 60 grams of sodium hydroxide. Butadiene being practically free from butylene is thus obtained besides unchanged vinylacetylene and small amounts of hydrogen.

What we claim is:

1. A process of producing butadiene which comprises treating vinylacetylene with amalgams of alkali metals in the presence of substances which develop hydrogen with the said amalgams.

2. A process of producing butadiene which comprises treating vinylacetylene with amalgams of alkali metals in the presence of a substance selected from the group consisting of water and alcohols.

3. A process of producing butadiene which comprises leading gaseous vinylacetylene into a mixture of an amalgam of alkali metals and water while moving the mixture vigorously.

4. A process of producing butadiene which comprises leading gaseous vinylacetylene into a mixture of an amalgam of alkali metals and water containing an electrolyte while moving the mixture vigorously.

5. A process of producing butadiene which comprises treating vinylacetylene with mixed amalgams of alkali metals in the presence of substances which develop hydrogen with the said amalgams.

6. A process of producing butadiene which comprises treating vinylacetylene with amalgams of alkali metals and of thallium in the presence of substances which develop hydrogen with the said amalgams.

ROBERT STADLER.
KARL ACKERMANN.
ERWIN LEHRER.